(12) United States Patent
Urban et al.

(10) Patent No.: US 10,634,255 B2
(45) Date of Patent: Apr. 28, 2020

(54) PRESSURE ACTIVATED ANTI-EXTRUSION RING FOR ANNULAR SEAL, SEAL CONFIGURATION, AND METHOD

(71) Applicants: Larry Urban, Santa Fe, TX (US); Gary Anderson, Humble, TX (US); Christopher David Young, Houston, TX (US)

(72) Inventors: Larry Urban, Santa Fe, TX (US); Gary Anderson, Humble, TX (US); Christopher David Young, Houston, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 0 days.

(21) Appl. No.: 15/386,371

(22) Filed: Dec. 21, 2016

(65) Prior Publication Data

US 2018/0172160 A1 Jun. 21, 2018

(51) Int. Cl.
*F16J 15/16* (2006.01)
*F16J 15/18* (2006.01)

(52) U.S. Cl.
CPC .............. *F16J 15/166* (2013.01); *F16J 15/18* (2013.01)

(58) Field of Classification Search
CPC .......... F16J 15/166; F16J 15/18; F16J 15/3256
See application file for complete search history.

(56) References Cited

U.S. PATENT DOCUMENTS

| | | | | |
|---|---|---|---|---|
| 2,119,252 A | * | 5/1938 | Thaheld | E21B 37/10 277/339 |
| 2,791,278 A | * | 5/1957 | Clark, Jr. | E21B 33/1212 166/134 |
| 2,913,053 A | * | 11/1959 | Westbrook | E21B 37/00 166/152 |
| 2,921,632 A | * | 1/1960 | Clark, Jr. | E21B 33/1216 277/338 |
| 3,381,969 A | * | 5/1968 | Crow | E21B 33/1208 277/340 |

(Continued)

FOREIGN PATENT DOCUMENTS

| | | |
|---|---|---|
| WO | 2012015716 A2 | 2/2012 |
| WO | 2013173084 A1 | 11/2013 |

OTHER PUBLICATIONS

Notification of Transmittal of the International Search Report and the Written Opinion of the International Searching Authority, or the Declaration; PCT/US2017/061487; dated Feb. 22, 2018; 11 pages.

*Primary Examiner* — Eugene G Byrd
(74) *Attorney, Agent, or Firm* — Cantor Colburn LLP

(57) ABSTRACT

An anti-extrusion ring including a ring body having a cross sectional shape, a radial contact surface making up a part of the cross sectional shape of the ring body the radial contact surface being configured to preferentially load a radial edge portion of the radial contact surface when the anti-extrusion ring is loaded, an axial contact surface making up a part of the cross sectional shape, the axial contact surface being configured to preferentially load an axial edge portion of the axial contact surface when the anti-extrusion ring is loaded, and an element load surface positioned between the radial edge portion and the axial edge portion and method for creating a seal.

17 Claims, 4 Drawing Sheets

(56) References Cited

U.S. PATENT DOCUMENTS

| | | | | |
|---|---|---|---|---|
| 3,784,214 A * | 1/1974 | Tamplen | ............ | E21B 33/1208 277/341 |
| 3,920,252 A * | 11/1975 | Dechavanne | ........ | F16J 15/3208 277/437 |
| 4,032,159 A * | 6/1977 | Zitting | ................... | F16J 15/166 277/473 |
| 4,326,588 A * | 4/1982 | McStravick | ........ | E21B 33/1208 166/124 |
| 4,349,205 A | 9/1982 | McGee et al. | | |
| 4,482,086 A * | 11/1984 | Wagner | ............... | E21B 33/1208 166/118 |
| 4,483,543 A * | 11/1984 | Fisher, Jr. | .............. | F16J 15/166 277/584 |
| 4,588,029 A * | 5/1986 | Blizzard | ............. | E21B 33/1295 166/120 |
| RE32,831 E * | 1/1989 | Shonrock | ............ | E21B 33/1216 166/135 |
| 4,809,989 A * | 3/1989 | Kernal | ................ | E21B 33/1208 267/1.5 |
| 5,165,703 A | 11/1992 | Morvant | | |
| 5,209,522 A | 5/1993 | Reaux | | |
| 5,306,021 A | 4/1994 | Morvant | | |
| 5,467,822 A * | 11/1995 | Zwart | ..................... | E21B 33/12 166/179 |
| 5,775,429 A * | 7/1998 | Arizmendi | ............ | E21B 33/128 166/196 |
| 6,142,227 A * | 11/2000 | Hiorth | .................. | E21B 33/1208 166/123 |
| 6,203,020 B1 * | 3/2001 | Mireles, Jr. | .......... | E21B 33/1216 277/336 |
| 6,343,791 B1 * | 2/2002 | Anyan | ................ | E21B 33/1216 277/337 |
| 6,637,750 B2 * | 10/2003 | Quoiani | ................... | F16L 17/00 277/339 |
| 6,758,478 B1 * | 7/2004 | Moreno | ................ | B60T 8/3675 277/584 |
| 6,769,491 B2 * | 8/2004 | Zimmerman | ....... | E21B 33/1204 166/138 |
| 7,789,135 B2 * | 9/2010 | Turley | ................ | E21B 33/1208 166/118 |
| 8,397,803 B2 * | 3/2013 | Crabb | ................... | E21B 33/134 166/129 |
| 9,145,755 B2 * | 9/2015 | Farquhar | ............ | E21B 33/1216 |
| 9,376,884 B2 * | 6/2016 | Clarke | ................ | E21B 33/1208 |
| 2002/0043368 A1 * | 4/2002 | Bell | ..................... | E21B 33/1216 166/118 |
| 2006/0186602 A1 * | 8/2006 | Martin | ................... | E21B 17/07 277/338 |
| 2012/0038115 A1 | 2/2012 | Herrera et al. | | |

\* cited by examiner

PRESSURE ACTIVATED ANTI-EXTRUSION RING FOR ANNULAR SEAL, SEAL CONFIGURATION, AND METHOD

BACKGROUND

In the drilling and completion industry, annular seals are ubiquitous. Because of the high pressure differentials in the industry, there are often concerns about extruding seals through relatively small gaps in structures intended to back up the annular seals. To address these issues anti-extrusion rings have been used to fill the gap. While some reduction in extrusion related difficulties has been achieved using prior art anti-extrusion rings, they still can experience extrusion themselves especially under higher pressures and temperatures ultimately resulting in the annular seal having difficulty passing regulatory requirements. In view hereof, the art is still in need of better solutions to extrusion issues.

SUMMARY

An anti-extrusion ring including a ring body having a cross sectional shape, a radial contact surface making up a part of the cross sectional shape of the ring body the radial contact surface being configured to preferentially load a radial edge portion of the radial contact surface when the anti-extrusion ring is loaded, an axial contact surface making up a part of the cross sectional shape, the axial contact surface being configured to preferentially load an axial edge portion of the axial contact surface when the anti-extrusion ring is loaded, and an element load surface positioned between the radial edge portion and the axial edge portion.

A seal configuration including a mandrel; an element disposed about the mandrel, a backup in operable communication with the element; and an anti-extrusion ring configured to preferentially load radial and axial edges of the ring.

A method for creating a seal including actuating an annular element, expanding the element against a back-up, loading an anti-extrusion ring with the element, the ring being configured to preferentially load a radial edge portion of a radial contact surface and an axial edge portion of an axial contact surface.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
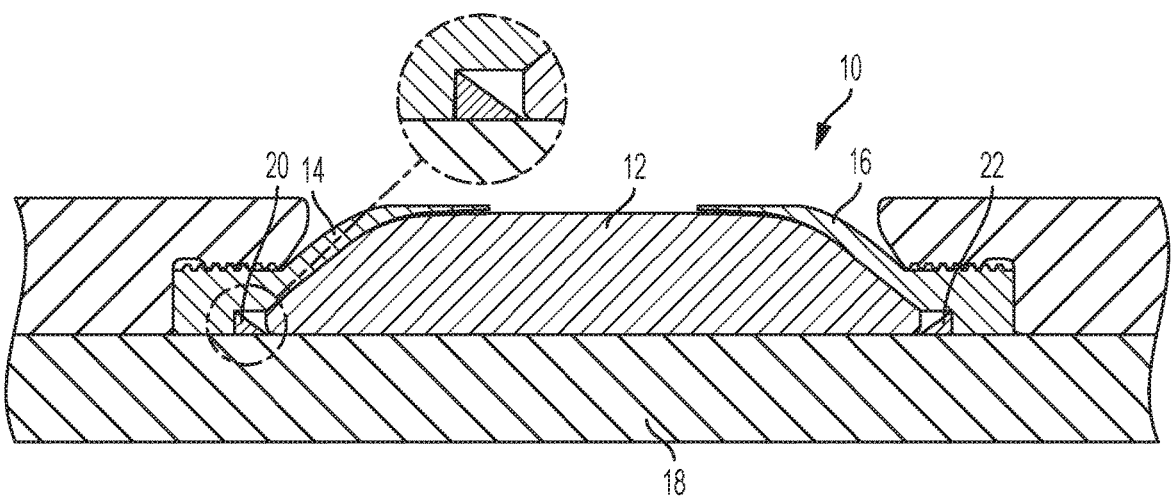
FIG. 1 is a schematic cross sectional view of an annular seal with back-up rings and further including an anti-extrusion ring as disclosed herein in a run in position.

Referring to FIG. 1, one of skill in the art will recognize a seal configuration 10 having an element 12 between back-ups 14 and 16 on a mandrel 18. The particular element depicted is a compression set element but other element types may be substituted including but not limited to elastomer, composite, plastic, fluid, gas, gel, powder, or other substance that can change shape under an applied force. Also illustrated are anti-extrusion rings 20 and 22, each comprising a ring body 23, annularly unbroken in an embodiment, having particular structural features that will be addressed hereunder with reference to the enlarged views of FIGS. 3 and 4. The anti-extrusion rings 20 and 22 are positioned to prevent extrusion of the element 12 into an extrusion gap 24 that exists between the backups 14, 16 and the mandrel 18. The extrusion gap also tends to increase as setting energy increases.

Figure 2:
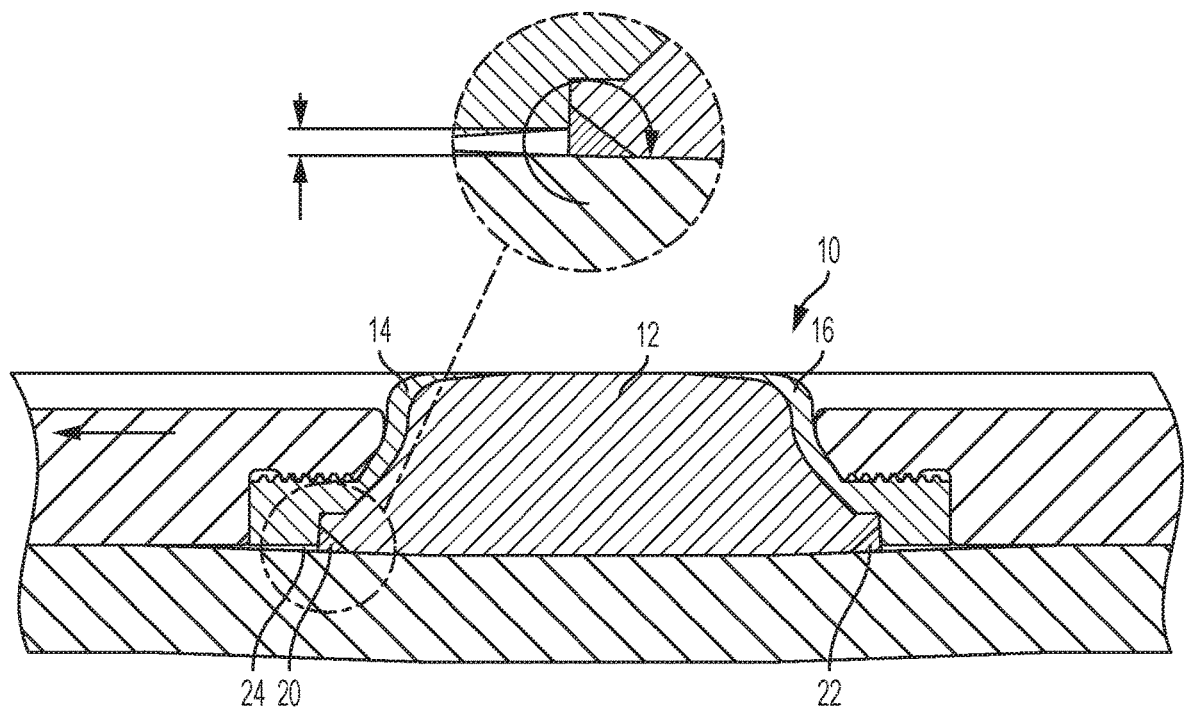
FIG. 2 is the embodiment of FIG. 1 in a set position.

Juxtaposing FIG. 1 and FIG. 2 one will appreciate that the position of components in FIG. 1 has changed in FIG. 2 due to actuation of the configuration 10. It is also evident that the extrusion gap 24 has increased. The anti-extrusion rings 20 and 22, however, are firmly in place and prevent extrusion of the element 12 into the extrusion gap 24.

Figure 3:
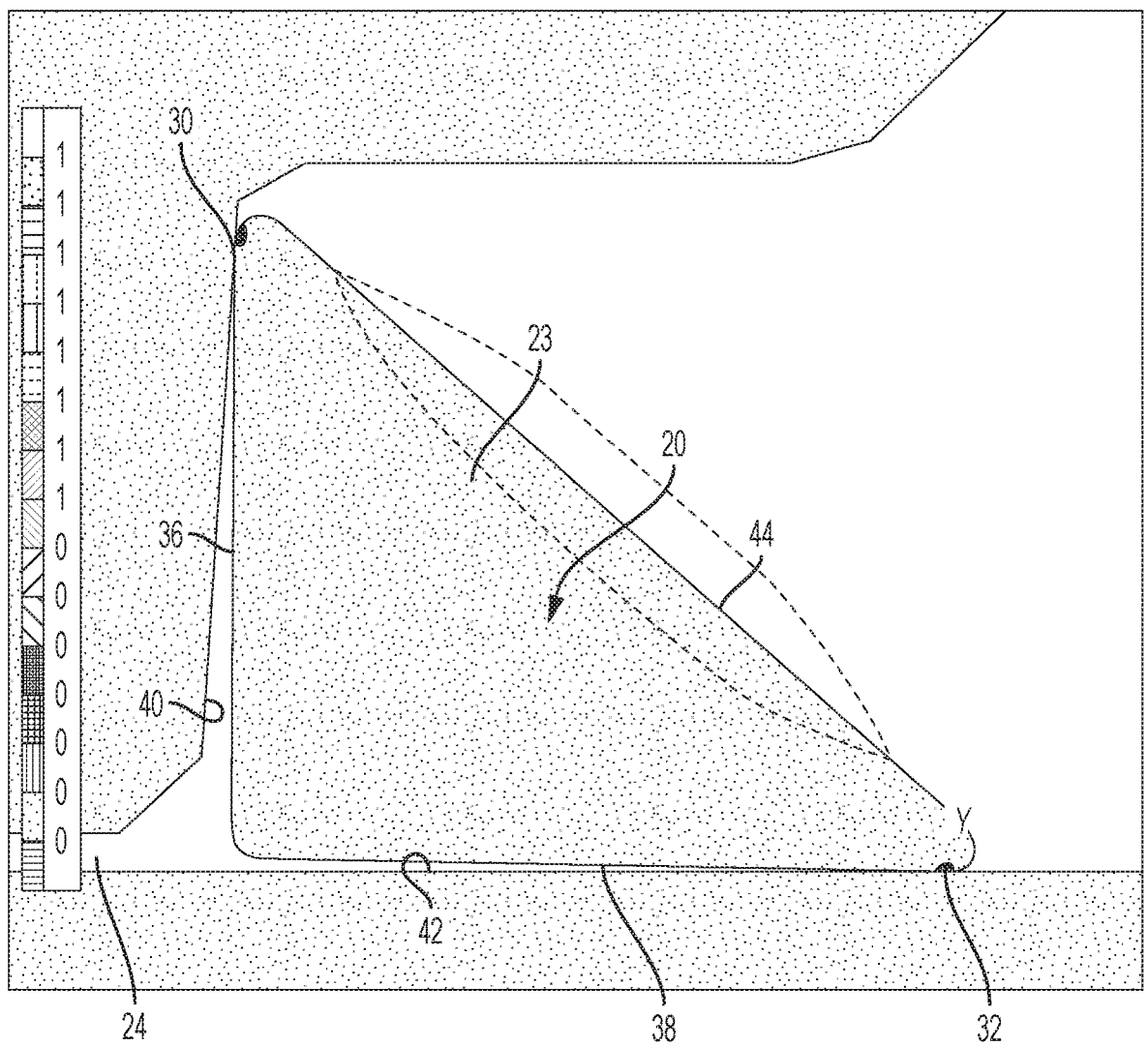
FIG. 3 is an enlarged view of a portion of the illustration of FIG. 1 at the initial contact position.
Figure 4:
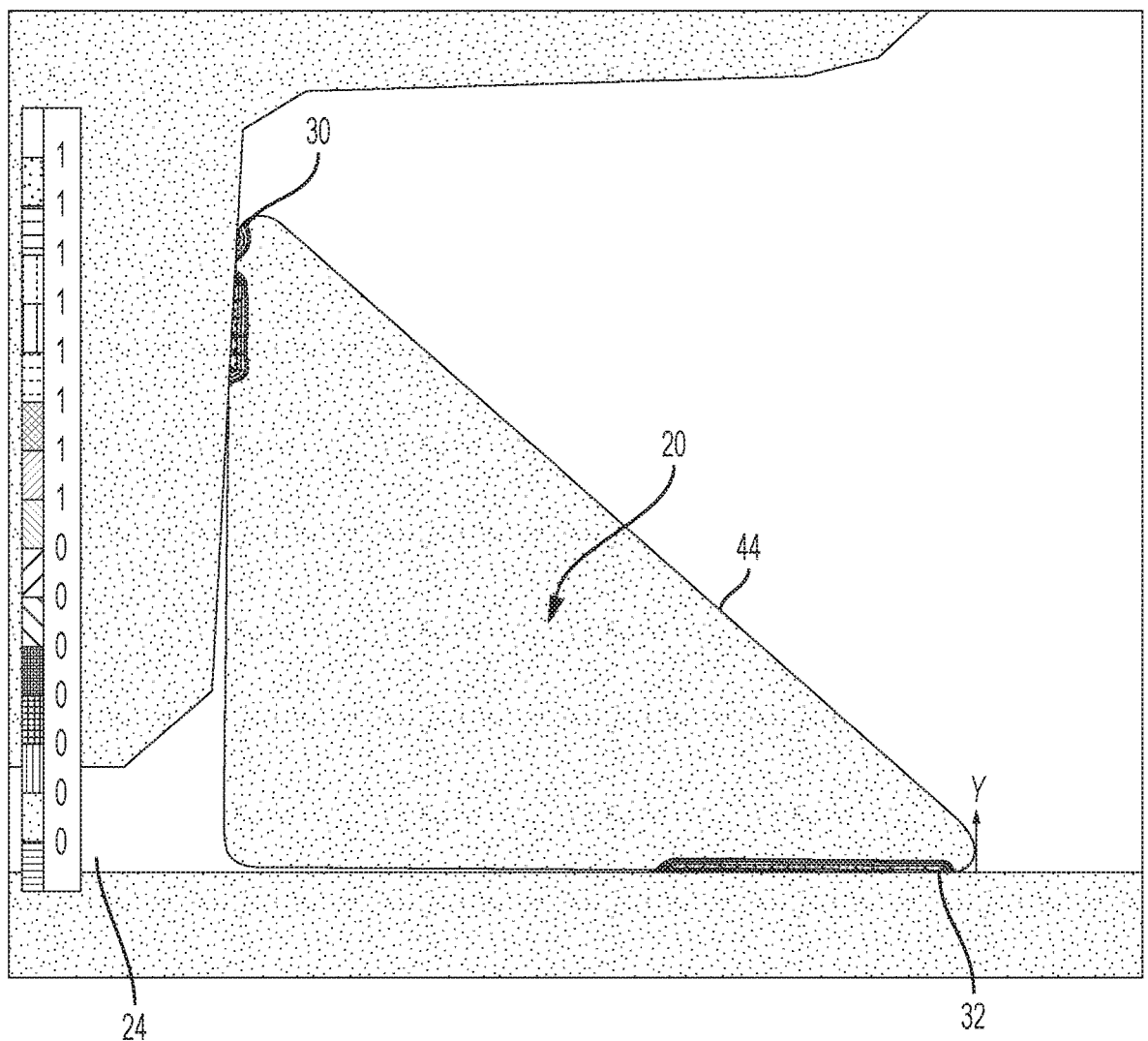
FIG. 4 is the same view as FIG. 3 but with contact at significantly higher pressure.

Referring to FIG. 3, the enlarged view allows a greater understanding of the success of the anti-extrusion ring as disclosed herein. In this embodiment a triangular cross section is presented but it is to be understood that any geometric shape that facilitates contact at the edge portions of the shape, the edge portions being defined as those illustrated as such in the drawings, rather than more centrally of the shape may be substituted. Specifically, it is to be noted that contact between the ring 20 (ring 20 is focused upon but it is to be understood that the features of the ring discussed may also apply to ring 22) and the backup 14 occurs at edge portion 30 and occurs between the ring 20 and the mandrel 18 at edge portion 32. It will also be appreciated the rest of the contact surfaces are not initially in contact with the respective mating surfaces at all. It will be understood that the rest of the contact surfaces if they do make contact with mating surfaces will only do so with deformation (elastic or plastic) of the edge portions. This is by design and is significant since it will ensure the greatest contact pressure occurs at the edge portions of the ring and is most effective in preventing extrusion of the element into an area 24 behind the ring 20. This in turn prevents an extruded portion of the element from acting on the ring in a direction opposite the intended direction, which would otherwise undermine the maximal contact pressure achieved and increase the risk of extrusion of the element past the ring 20.

Figure 5:
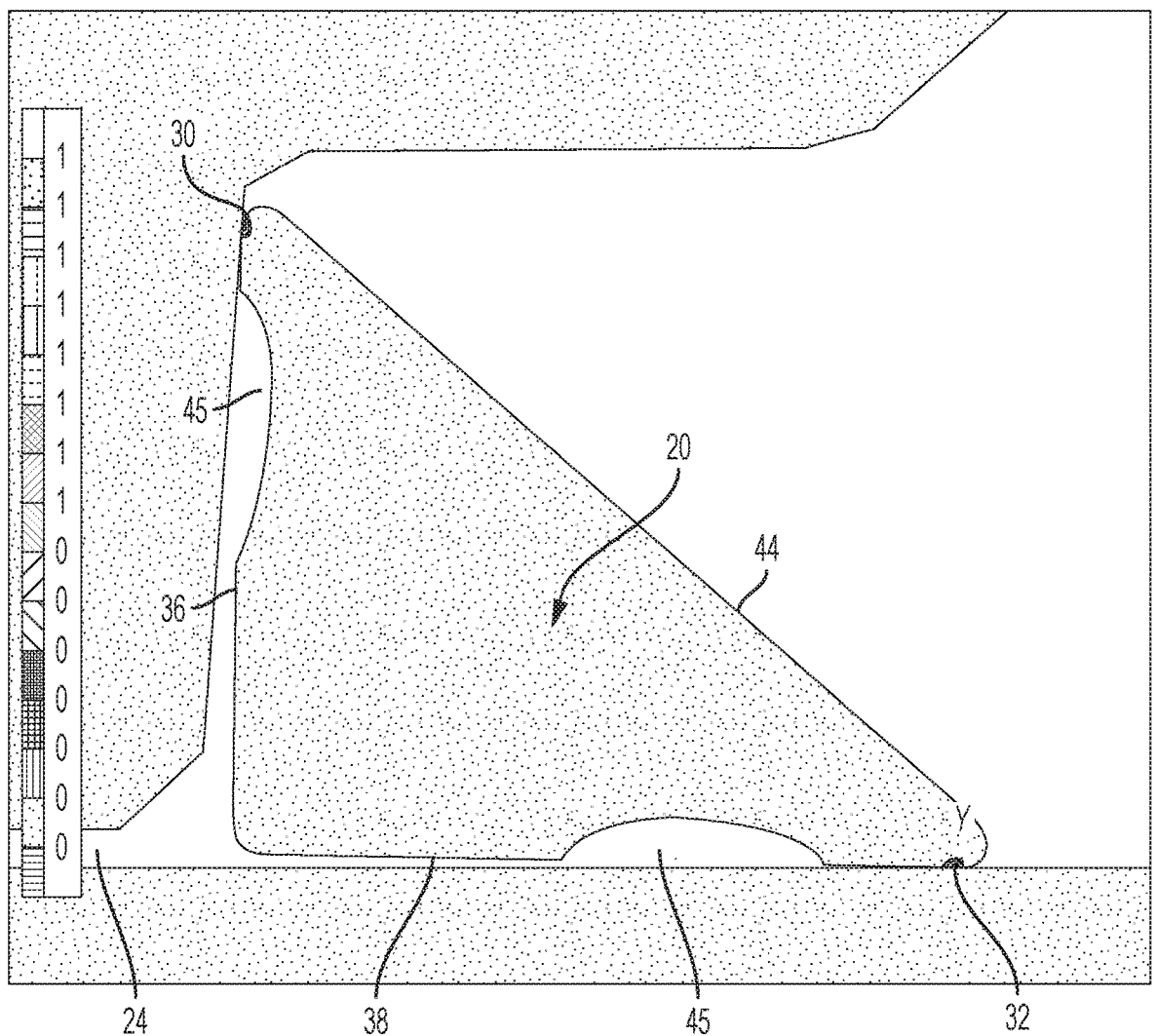
FIG. 5 is an alternate embodiment employing a geometric recess.

The structure to achieve the results noted from the rings 20 and 22 of this disclosure includes a radial contact surface 36 and an axial contact surface 38 that are angled at something other than parallel to a back-up mating surface 40 and a mandrel mating surface 42, respectively. It is further contemplated as illustrated in FIG. 5 that a geometry of any of the surfaces that amounts to a recess 45 relative to the edge 30 or 32 such that loaded contact will occur at least preferentially at those edges 30 and 32 is employable. It is also possible to reverse the recess by providing a recess on the mating surfaces instead or to provide recesses both as shown in FIG. 5 and in the respective mating surfaces if greater gap distance between surfaces and mating surfaces is desired.

In each case, the mismatch in angles or geometries of the surfaces is oriented to ensure that contact surfaces 36 and 38 are farther from their respective mating surfaces 40 and 42 with greater proximity to the extrusion gap 24 and accordingly closer to those respective mating surfaces at greater distance from the extrusion gap 24. The ring 20 further includes an element load surface 44 that spans between the radial and axial edge portions and is configured to interact with the element 12 which will load the ring 20. It is to be understood that the load surface 44 may have a variety of shapes including concavities (illustrated in broken line), convexities illustrated in broken line) and substantially flat as illustrated in solid line. This is easily seen in FIG. 3. In the particular cross section illustrated the triangle may include angles of greater than 90 degrees near the gap 24 to ensure loading at the edge portions of the anti-extrusion ring as shown. Viewed in another way, the edge portions are less than 270 degrees from one another when measured outside of the triangle (i.e. external angle). In essence, the configuration is such that the radial contact surface 36 and the axial contact surface 38 are angled relative to each other to define an included angle that is greater than an angle defined between the back-up mating surface 40 and the mandrel mating surface 42 with which the anti-extrusion ring is intended to operate.

In each case, the edge portions and contact surfaces are necessarily predisposed to load at the edge portions and thereby support the intent of the disclosure by most forcefully loading the edge portions. The non parallel nature of the surfaces can be achieved entirely from the ring side of the equation, can be achieved through adjustment of the surfaces on both sides of the equation or even could be achieved by adjustment of only one or more of the mating surfaces. It will be appreciated that the latter two iterations would require redesigned mandrel and/or back-ups in contrast to an iteration where the requisite condition is created only on the ring side of the equation, which would allow for rings to be manufactured and used in a retrofit on mandrels and with back-ups that have not been configured in accordance with the teachings hereof or could still be used on redesigned components.

The anti-extrusion ring supports a more robust and reliable annular seal configuration.

A method for creating a seal in a tubular member is also contemplated comprising actuating an annular element such as by compression, inflation, swelling, etc. Resulting from actuation is an expansion of the element against a back-up, or two back-ups if one is used at each axial end of the element. Due to the expansion of the element, a load is placed upon the anti-extrusion ring, the ring being configured to preferentially load a radial edge portion of a radial contact surface and an axial edge portion of an axial contact surface.

Set forth below are some embodiments of the foregoing disclosure:

Embodiment 1

An anti-extrusion ring including a ring body having a cross sectional shape, a radial contact surface making up a part of the cross sectional shape of the ring body the radial contact surface being configured to preferentially load a radial edge portion of the radial contact surface when the anti-extrusion ring is loaded, an axial contact surface making up a part of the cross sectional shape, the axial contact surface being configured to preferentially load an axial edge portion of the axial contact surface when the anti-extrusion ring is loaded, an element load surface positioned between the radial edge portion and the axial edge portion.

Embodiment 2

The anti-extrusion ring as in any prior embodiment wherein the ring body is annularly unbroken.

Embodiment 3

The anti-extrusion ring as in any prior embodiment wherein the radial contact surface and the axial contact surface are less than 270 degrees external angle from one another.

Embodiment 4

The anti-extrusion ring as in any prior embodiment wherein the radial contact surface and the axial contact surface are angled relative to each other to define an included angle that is greater than an angle between a back-up and a mandrel with which the anti-extrusion ring is intended to operate.

Embodiment 5

The anti-extrusion ring as in any prior embodiment wherein one or more of the radial contact surface and axial contact surface comprise a recess.

Embodiment 6

The anti-extrusion ring as in any prior embodiment wherein the cross sectional shape is triangular.

Embodiment 7

The anti-extrusion ring as in any prior embodiment wherein the triangular shape includes an angle between the radial contact surface and the axial contact surface of greater than 90 degrees.

Embodiment 8

The anti-extrusion ring as in any prior embodiment wherein the load surface is concave.

Embodiment 9

The anti-extrusion ring as in any prior embodiment wherein the load surface is convex.

Embodiment 10

The anti-extrusion ring as in any prior embodiment wherein the load surface is flat.

Embodiment 11

The anti-extrusion ring as in any prior embodiment wherein one or more of the radial contact surface and axial contact surface includes a recess.

Embodiment 12

A seal configuration including a mandrel, an element disposed about the mandrel, a backup in operable communication with the element and an anti-extrusion ring configured to preferentially load radial and axial edges of the ring.

Embodiment 13

The configuration as in any prior embodiment wherein the ring includes a ring body having a cross sectional shape, a radial contact surface making up a part of the cross sectional shape of the ring body the radial contact surface being configured to preferentially load a radial edge portion of the radial contact surface when the anti-extrusion ring is loaded, an axial contact surface making up a part of the cross sectional shape, the axial contact surface being configured to preferentially load an axial edge portion of the axial contact surface when the anti-extrusion ring is loaded, an element load surface positioned between the radial edge portion and the axial edge portion.

Embodiment 14

The configuration as in any prior embodiment wherein the radial contact surface and the axial contact surface are angled relative to each other to define an included angle that is greater than an angle between the back-up and the mandrel.

Embodiment 15

The configuration as in any prior embodiment wherein the back-up is two back-ups, one on each axial end of the element and the ring is two rings, one positioned at each back-up.

Embodiment 16

A method for creating a seal including actuating an annular element, expanding the element against a back-up, loading an anti-extrusion ring with the element, the ring being configured to preferentially load a radial edge portion of a radial contact surface and an axial edge portion of an axial contact surface.

Embodiment 17

The method as in any prior embodiment wherein the actuating is compressing.

Embodiment 18

The method as in any prior embodiment further comprising preventing extrusion of the element past the anti-extrusion ring.

The use of the terms "a" and "an" and "the" and similar referents in the context of describing the invention (especially in the context of the following claims) are to be construed to cover both the singular and the plural, unless otherwise indicated herein or clearly contradicted by context. Further, it should be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, production of reservoir fluids, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. An anti-extrusion ring comprising:
    a ring body having a cross sectional shape and a central axis defined by the ring body;
    a radial contact surface making up a part of the cross sectional shape of the ring body the radial contact surface having a structure that necessarily preferentially loads a radial edge portion of the radial contact surface when the anti-extrusion ring is loaded, the radial contact surface being at an angle that is nonorthogonal to the central axis such that the radial contact surface forms an inwardly extending frustocone;
    an axial contact surface making up a part of the cross sectional shape, the axial contact surface having a structure that necessarily preferentially loads an axial edge portion of the axial contact surface when the anti-extrusion ring is loaded, the axial contact surface forming an angle with the central axis such that the axial contact surface is farther from the central axis at a point nearer the radial contact surface and closer to the central axis at the axial edge portion;
    an element load surface positioned between the radial edge portion and the axial edge portion; and wherein the entire radial contact surface and the entire axial contact surface are less than 270 degrees external angle from one another.

2. The anti-extrusion ring as claimed in claim 1 wherein the ring body is annularly unbroken.

3. The anti-extrusion ring as claimed in claim 1 wherein the radial contact surface and the axial contact surface are angled relative to each other to define an included angle that is greater than an angle between a back-up and a mandrel with which the anti-extrusion ring is intended to operate.

4. The anti-extrusion ring as claimed in claim 1 wherein one or more of the radial contact surface and axial contact surface comprise a recess.

5. The anti-extrusion ring as claimed in claim 1 wherein the cross sectional shape is triangular.

6. The anti-extrusion ring as claimed in claim 5 wherein the triangular shape includes an angle between the radial contact surface and the axial contact surface of greater than 90 degrees.

7. The anti-extrusion ring as claimed in claim 1 wherein the load surface is concave.

8. The anti-extrusion ring as claimed in claim 1 wherein the load surface is convex.

9. The anti-extrusion ring as claimed in claim 1 wherein the load surface is flat.

10. The anti-extrusion ring as claimed in claim 1 wherein one or more of the radial contact surface and axial contact surface includes a recess.

11. A seal configuration comprising:
a mandrel;
an element disposed about the mandrel;
a backup in operable communication with the element; and
a ring body having a cross sectional shape and a central axis defined by the ring body;
   a radial contact surface making up a part of the cross sectional shape of the ring body the radial contact surface having a structure that necessarily preferentially loads a radial edge portion of the radial contact surface when the anti-extrusion ring is loaded, the radial contact surface being at an angle that is nonorthogonal to the central axis such that the radial contact surface forms an inwardly extending frustocone;
   an axial contact surface making up a part of the cross sectional shape, the axial contact surface having a structure that necessarily preferentially loads an axial edge portion of the axial contact surface when the anti-extrusion ring is loaded, the axial contact surface forming an angle with the central axis such that the axial contact surface is farther from the central axis at a point nearer the radial contact surface and closer to the central axis at the axial edge portion;
      an element load surface positioned between the radial edge portion and the axial edge portion; and wherein the entire radial contact surface and the entire axial contact surface are less than 270 degrees external angle from one another.

12. The configuration as claimed in claim 11 wherein the axial contact surface includes a an axial edge portion and the radial contact surface includes a radial edge portion, an element load surface being positioned between the radial edge portion and the axial edge portion.

13. The configuration as claimed in claim 12 wherein the radial contact surface and the axial contact surface are angled relative to each other to define an included angle that is greater than an angle between the back-up and the mandrel.

14. The configuration as claimed in claim 11 wherein the back-up is two back-ups, one on each axial end of the element and the ring is two rings, one positioned at each back-up.

15. A method for creating a seal comprising:
actuating an annular element;
expanding the element against a back-up;
loading an anti-extrusion ring with the element, the ring having:
   a ring body having a cross sectional shape and a central axis defined by the ring body;
   a radial contact surface making up a part of the cross sectional shape of the ring body the radial contact surface having a structure that necessarily preferentially loads a radial edge portion of the radial contact surface when the anti-extrusion ring is loaded, the radial contact surface being at an angle that is nonorthogonal to the central axis such that the radial contact surface forms an inwardly extending frustocone;
   an axial contact surface making up a part of the cross sectional shape, the axial contact surface having a structure that necessarily preferentially loads an axial edge portion of the axial contact surface when the anti-extrusion ring is loaded, the axial contact surface forming an angle with the central axis such that the axial contact surface is farther from the central axis at a point nearer the radial contact surface and closer to the central axis at the axial edge portion;
      an element load surface positioned between the radial edge portion and the axial edge portion; and wherein the entire radial contact surface and the entire axial contact surface are less than 270 degrees external angle from one another.

16. The method as claims in claim 15 wherein the actuating is compressing.

17. The method as claimed in claim 15 further comprising preventing extrusion of the element past the anti-extrusion ring.

* * * * *